US011785916B1

(12) United States Patent
Fuchs

(10) Patent No.: US 11,785,916 B1
(45) Date of Patent: Oct. 17, 2023

(54) ANIMAL COOLING MAT

(71) Applicant: Maranda Enterprises, Mequon, WI (US)

(72) Inventor: Mark Fuchs, Mequon, WI (US)

(73) Assignee: MARANDA ENTERPRISES, Mequon, WI (US)

( * ) Notice: Subject to any disclaimer, the term of this patent is extended or adjusted under 35 U.S.C. 154(b) by 13 days.

(21) Appl. No.: 16/207,990

(22) Filed: Dec. 3, 2018

Related U.S. Application Data

(63) Continuation-in-part of application No. 16/160,054, filed on Oct. 15, 2018, now Pat. No. 11,570,970.

(60) Provisional application No. 62/594,258, filed on Dec. 4, 2017.

(51) Int. Cl.
| | |
|---|---|
| *A01K 1/015* | (2006.01) |
| *F25D 3/02* | (2006.01) |
| *B32B 3/18* | (2006.01) |
| *B32B 5/18* | (2006.01) |

(52) U.S. Cl.
CPC ............ *A01K 1/0158* (2013.01); *A01K 1/0157* (2013.01); *B32B 3/18* (2013.01); *B32B 5/18* (2013.01); *F25D 3/02* (2013.01); *B32B 2266/0214* (2013.01); *B32B 2266/08* (2013.01); *B32B 2307/304* (2013.01)

(58) Field of Classification Search
CPC .... A01K 1/0157; A01K 1/0158; A01K 1/0353
USPC ................................................. 119/28.5, 526
See application file for complete search history.

(56) References Cited

U.S. PATENT DOCUMENTS

| | | | | |
|---|---|---|---|---|
| 2,064,458 | A | * 12/1936 | Bulpit et al. | ......... A47G 9/0207 5/413 R |
| 3,694,983 | A | * 10/1972 | Couquet | ................ B29C 70/78 52/384 |
| 3,889,684 | A | * 6/1975 | Lebold | .................... A61F 7/02 607/109 |
| 4,060,276 | A | * 11/1977 | Lindsay | .................. A47C 7/74 297/180.11 |
| 4,064,835 | A | | 12/1977 | Rabenbauer |

(Continued)

FOREIGN PATENT DOCUMENTS

| | | |
|---|---|---|
| CN | 101305877 A | 11/2008 |
| CN | 201452402 U | 5/2010 |

(Continued)

*Primary Examiner* — Brady W Frazier
*Assistant Examiner* — Zoe Tam Tran
(74) *Attorney, Agent, or Firm* — Joseph T. Miotke; Elizabeth L. Neal; DeWitt LLP

(57) ABSTRACT

The present animal cooling mat apparatus includes a mat shell, at least one coolant sheet, at least one cushioning pad, and at least one foam pad. The coolant sheet is removably located within the mat shell, with the cushioning pad removably located within the mat shell above the at least one coolant sheet and the insulating pad is located within the mat shell below the at least one coolant sheet. The coolant sheet provides a heat sink to rapidly cool an animal, while the cushioning pad facilitates heat transfer and the insulating pad reduces the amount of ambient heat transferred from the environment. Multiple apparatuses may be combined to accommodate larger animals.

19 Claims, 5 Drawing Sheets

(56) References Cited

U.S. PATENT DOCUMENTS

| | | | | |
|---|---|---|---|---|
| 4,154,245 A * | 5/1979 | Daily | | A61F 7/10 |
| | | | | 607/105 |
| 4,311,022 A * | 1/1982 | Hall | | A45C 11/20 |
| | | | | 62/372 |
| 4,459,714 A * | 7/1984 | Lin | | A47C 27/081 |
| | | | | 24/581.12 |
| 4,604,987 A * | 8/1986 | Keltner | | A47C 1/16 |
| | | | | 126/204 |
| 4,605,006 A * | 8/1986 | Jacques | | A61F 7/12 |
| | | | | 607/113 |
| 4,629,358 A * | 12/1986 | Springston et al. | | E01C 5/22 |
| | | | | 404/35 |
| 4,631,765 A * | 12/1986 | Casey | | A47G 9/0207 |
| | | | | 428/33 |
| 4,878,258 A * | 11/1989 | Casey | | A47G 9/0207 |
| | | | | 5/420 |
| 4,886,063 A * | 12/1989 | Crews | | A61F 7/02 |
| | | | | 62/530 |
| 4,899,693 A * | 2/1990 | Arnold | | A01K 1/0236 |
| | | | | 119/28.5 |
| 5,002,014 A * | 3/1991 | Albin | | A01K 1/0353 |
| | | | | 119/28.5 |
| 5,084,928 A * | 2/1992 | Skillington | | A47G 9/0253 |
| | | | | 5/482 |
| 5,111,810 A * | 5/1992 | Fortney | | A61F 7/02 |
| | | | | 607/108 |
| 5,144,911 A * | 9/1992 | Moore et al. | | A01K 1/0353 |
| | | | | 119/28.5 |
| 5,545,198 A * | 8/1996 | Owens | | A47C 7/744 |
| | | | | 607/108 |
| 5,991,948 A * | 11/1999 | Stanley et al. | | A01K 1/0157 |
| | | | | 5/421 |
| 6,128,795 A | 10/2000 | Stanley et al. | | |
| 6,132,455 A | 10/2000 | Shang | | |
| 6,210,427 B1 | 4/2001 | Augustine et al. | | |
| 6,482,332 B1 | 11/2002 | Malach | | |
| 6,848,746 B2 * | 2/2005 | Gentry | | A47C 7/021 |
| | | | | 297/380 |
| 7,036,162 B1 | 5/2006 | Gatten | | |
| 7,324,340 B2 | 1/2008 | Xiong | | |
| 7,536,740 B1 * | 5/2009 | Swartz | | A47C 20/026 |
| | | | | 5/630 |
| 7,794,485 B2 * | 9/2010 | Caceres et al. | | A61F 7/10 |
| | | | | 607/114 |
| 8,556,337 B1 * | 10/2013 | Cornitius-Cary | | A47C 7/021 |
| | | | | 224/275 |
| 8,720,218 B2 | 5/2014 | Prendergast | | |
| 9,226,474 B2 | 1/2016 | Prendergast | | |
| 9,854,783 B2 * | 1/2018 | Westgarth | | A01K 1/0158 |
| 10,660,791 B2 * | 5/2020 | Zakai | | A61F 7/10 |
| 2005/0262871 A1 * | 12/2005 | Bailey-Weston | | A61F 7/103 |
| | | | | 62/457.2 |
| 2008/0295775 A1 * | 12/2008 | Arvanites | | A01K 1/0353 |
| | | | | 119/28.5 |
| 2009/0132013 A1 | 5/2009 | Amalfi | | |
| 2010/0108287 A1 * | 5/2010 | Ota et al. | | A61F 7/10 |
| | | | | 165/46 |
| 2010/0319126 A1 * | 12/2010 | Craib | | A47G 9/0253 |
| | | | | 5/490 |
| 2012/0111276 A1 * | 5/2012 | Leahy et al. | | A01K 1/0353 |
| | | | | 119/28.5 |
| 2012/0266822 A1 * | 10/2012 | Stevens et al. | | A01K 1/0157 |
| | | | | 119/28.5 |
| 2013/0025059 A1 * | 1/2013 | Ratte | | A61F 7/10 |
| | | | | 5/641 |

FOREIGN PATENT DOCUMENTS

| | | | | |
|---|---|---|---|---|
| WO | 2008021293 A1 * | 2/2008 | | A47C 31/007 |
| WO | 2015012859 A1 * | 1/2015 | | A47C 27/15 |

* cited by examiner

# ANIMAL COOLING MAT

CROSS-REFERENCES TO RELATED APPLICATIONS

This application claims the benefit of prior-filed U.S. Provisional Pat. Application No. 62/594,258, filed on Dec. 4, 2017 and is a continuation in part of U.S. Pat. Application No. 16/160,054, filed on Oct. 15, 2018, which claims benefit of U.S. Provisional Pat. Application 62/571,983, filed on Oct. 13, 2018, the contents of which are incorporated herein by reference in their entirety.

BACKGROUND OF THE INVENTION

The present invention relates to a support for an animal, and more specifically, to a cooling mat for an animal.

Animals such as dogs can be extremely sensitive to heat due to their size, lack of sweat glands, and often thick fur coats. A dog outside on a hot day can quickly overheat, going from a normal body temperature of 101 degrees to a hyperthermic 104 degrees in only a few minutes of exercise. Dogs with stocky bodies heat up faster and cool down slower, as do small breeds and brachycephalic breeds (e.g. pugs and bulldogs). News networks are replete with stories of dogs left in cars or outside on hot days who overheated and died. In 2012, a beloved bulldog college mascot died of heatstroke during an outside excursion in triple-digit temperatures. In the aftermath of a 2016 earthquake, a search and rescue dog died of heatstroke after rescuing seven people from a collapsed building.

Unfortunately, many dogs require daily exercise or trips outside to eliminate waste. Even short excursions in high temperatures can be harmful, especially for elderly or infirm dogs. Working dogs, such as explosive- and contraband-detecting dogs, members of law enforcement and military K9 units, guard dogs, service dogs, search and rescue dogs, and others often do not have the luxury of waiting for temperatures to cool before venturing outside. Working dogs must frequently venture into areas far from air conditioning, and may be required to exert themselves over long distances.

If air conditioning breaks down or is otherwise unavailable, or if a dog requires immediate, drastic cooling, immersion in a container of cool water may be the only way to cool the dog. This solution is obviously problematic if one lacks a cool water source. Dogs may resist immersion or otherwise be difficult for a small, elderly, or disabled owner to lift into the container. It may be difficult to find a container capable of accommodating large dogs, especially without going back outdoors into the heat.

Some owners attempt to cool dogs using protective coverings with evaporating water. Sadly, if the ambient humidity level is too high, evaporative coverings can actually transfer heat to the dog, making the problem worse. The moisture can also cause skin irritation. Gel cushioning pads for dogs to rest on do transfer some heat, but cannot provide sufficient heat transfer or heat sink capacity for rapid or prolonged cooling. If placed on a warmed surface, such as a warm floor, gel cushioning pads rapidly transfer heat from the warm surface, possibly negating any heat transfer from the dog.

The present invention provides a simple, thermally effective means of rapidly cooling an animal which can be adapted for large or small animals.

BRIEF SUMMARY

The present animal cooling mat apparatus includes a mat shell, at least one coolant sheet, at least one cushioning pad, and at least one foam pad. The coolant sheet is removably located within the mat shell, with the cushioning pad removably located within the mat shell above the at least one coolant sheet and the insulating pad is located within the mat shell below the at least one coolant sheet.

The present cooling mat system includes a plurality of the above animal cooling mat apparatuses disclosed above. Each of the animal cooling mat apparatuses is connected along at least one edge to another of the animal cooling mat apparatuses

DETAILED DESCRIPTION OF THE INVENTION

Figure 1A:
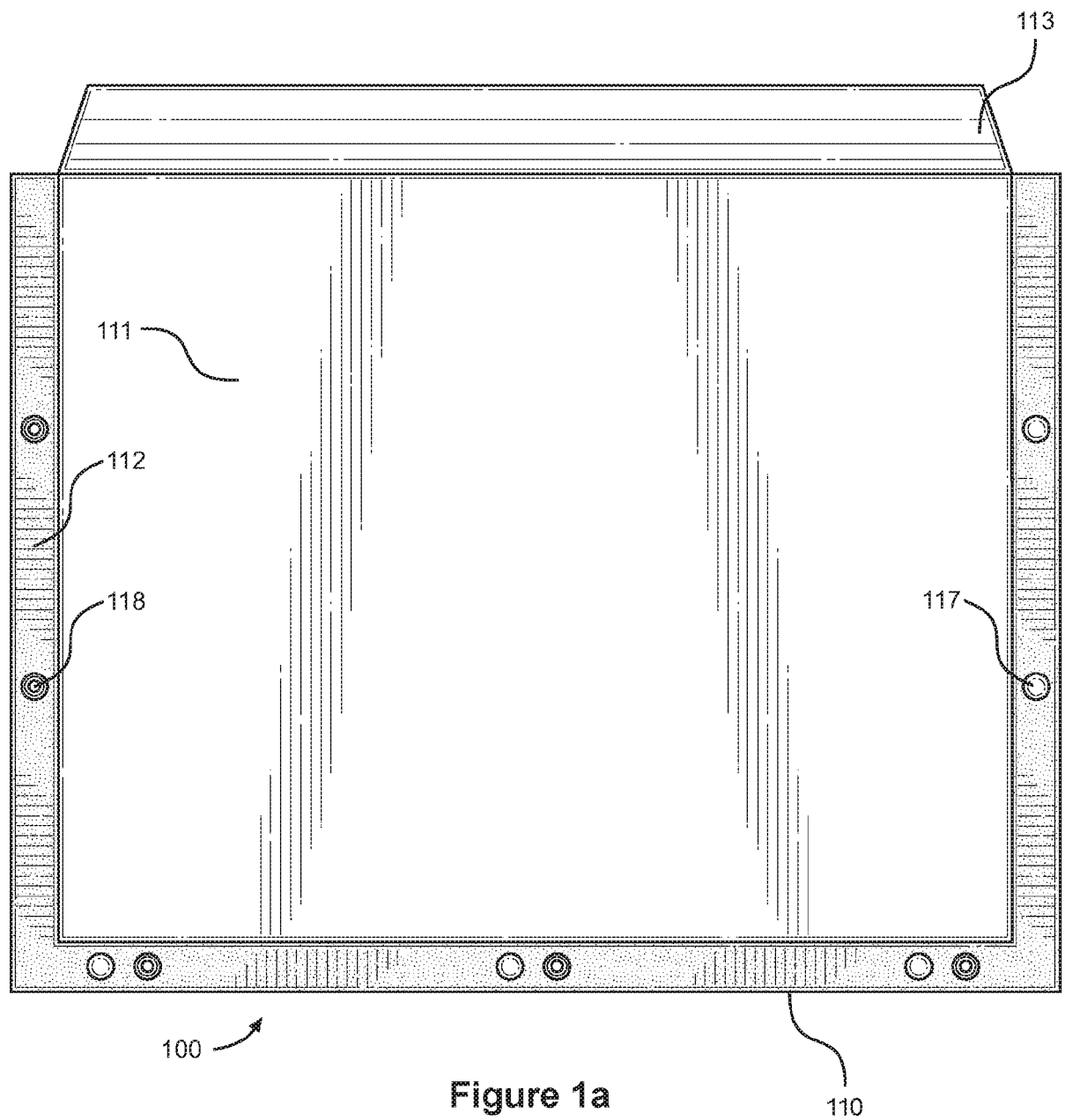
FIGS. 1a, 1b, 1c, and 1d illustrate top, bottom, cross-sectional, and front views, respectively, of an aspect of an animal cooling mat.
Figure 1B:
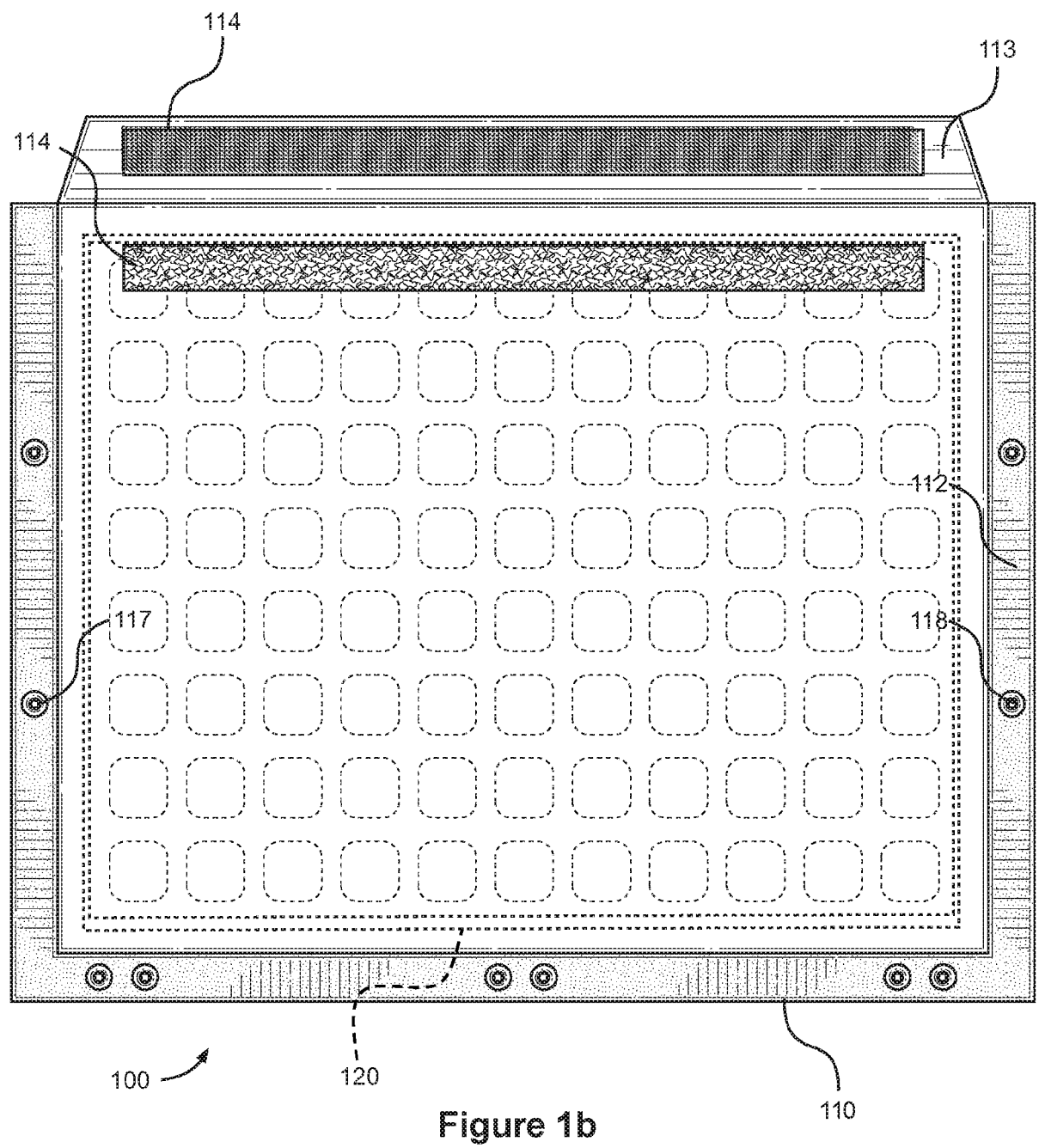
Figure 1C:
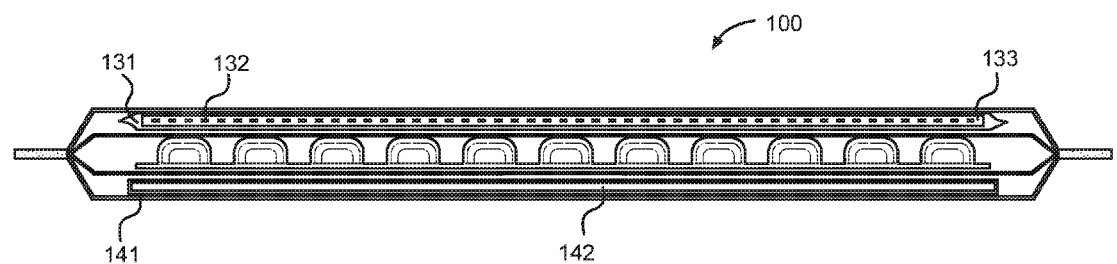
Figure 1D:
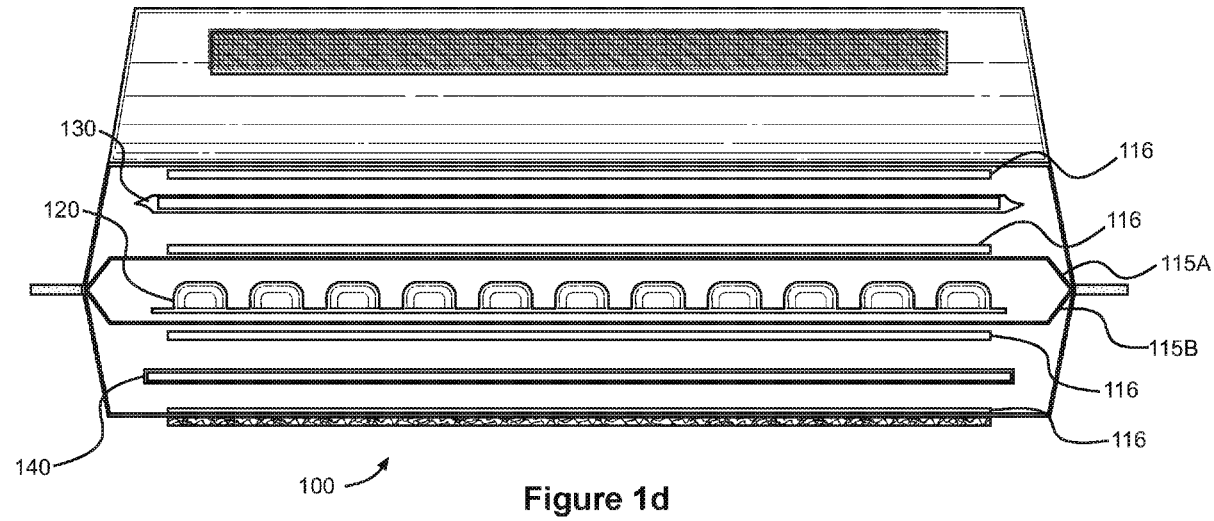
Figure 2:
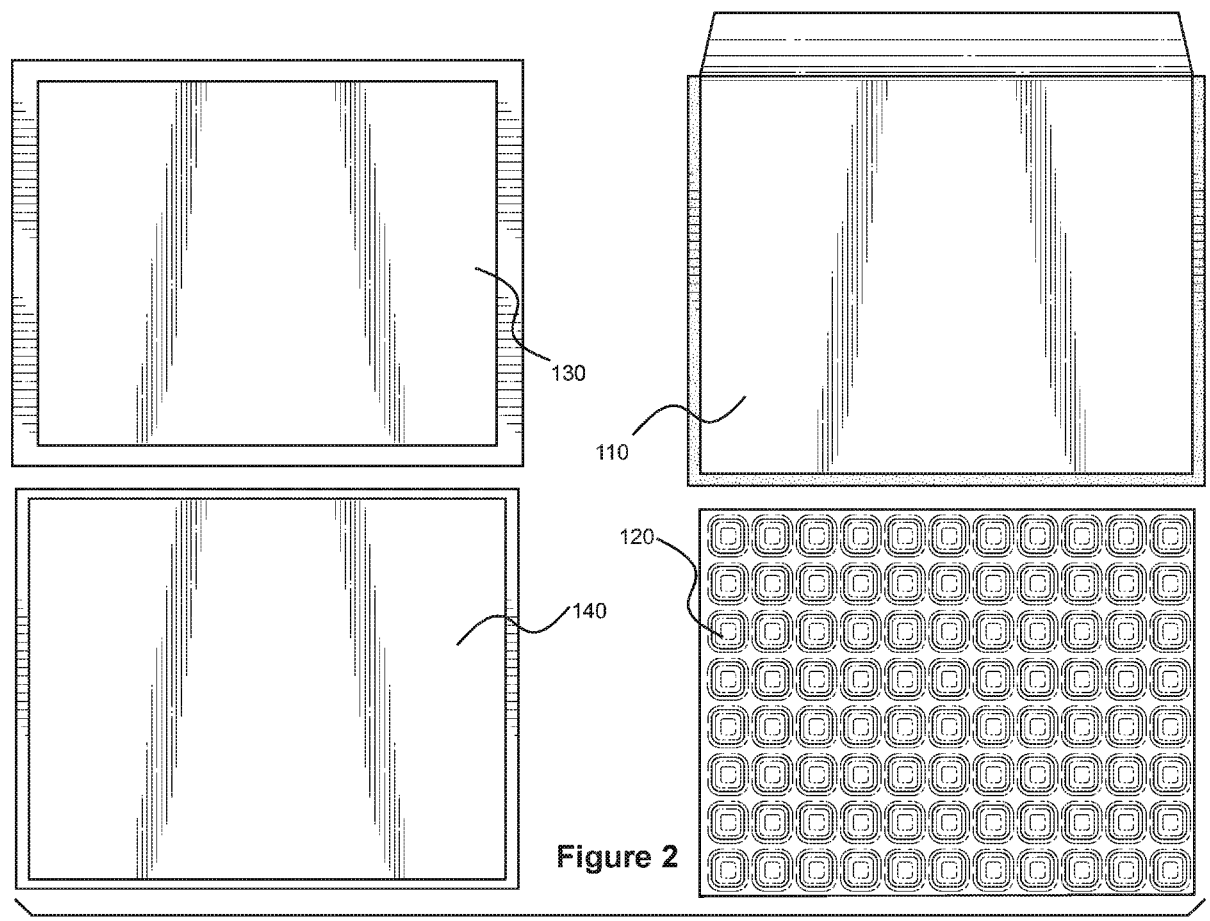
FIG. 2 illustrates a disassembled view of an aspect of an animal cooling mat.

FIGS. 1a, 1b, 1c, and 1d illustrate top, bottom, cross-sectional, and front views, respectively, of one aspect of an animal cooling mat 100. Cooling mat 100 includes a mat shell 110 enclosing a removable coolant sheet 120, a removable cushioning pad 130, and a removable insulating pad 140. FIG. 1d shows mat shell 110 completely opened for removal of coolant sheet 120, cushioning pad 130, and/or insulating pad 140. FIG. 2 shows animal cooling mat 100 with coolant sheet 120, cushioning pad 130, and insulating pad 140 removed from mat shell 110.

The outer surface of mat shell 110 is shell envelope 111 which may be formed by two rectangular layers of material connected together along three sides, such as by stitching, adhesive, heat sealing, folding a larger piece of material, or any combination thereof within the same side or between sides. In various aspects, the shell envelope fabric is a ripstop polyester fabric coated with a polymer backing on its inner surface. In one aspect, the shell envelope is a 420 Denier ripstop polyester fabric coated with polyvinyl chloride (PVC). A shell binding 112 may be folded over one or more of the three connected sides and stitched in place to prevent unravelling and increase edge strength. Shell envelope 111 is typically machine washable.

Shell envelope 111 can be closed by means of a shell closure flap 113 extending from an unattached edge of one of the rectangular layers. Usually, half of at least one shell closure fastener 114 is located on shell closure flap 113, while the other is located on the outer surface of the other layer, allowing shell closure flap 113 to be folded over and held in place, closing shell envelope 111. In one aspect, shell closure fastener 114 is a hook-and-loop fastener. In other aspects, shell closure fastener 114 is a snap fastener, a zipper fastener, or a button fastener. Certain aspects may dispense with shell closure flap 113 and use a zippered shell closure fastener 114 affixed directly to the rectangular layers to close shell envelope 111.

In certain aspects, mat shell 110 may also include optional upper and lower inner dividers 115a and 115b which can be used to separate removable coolant sheet 120, removable cushioning pad 130, and/or removable insulating pad 140, and hold them in place. Each inner divider 115 may be a layer of material held in place between layers of shell envelope 111. In various aspects, the inner divider fabric can be a synthetic fabric, such as, but not limited to, polyester fabric. In one aspect, the inner divider fabric is a 210 Denier polyester fabric. Divider fasteners 116 may close each inner divider 115 to an interior surface of shell envelope 111 or another inner divider 115. In one aspect, divider fasteners 115 are hook-and-loop fasteners. Other aspects may use a snap fastener, a zipper fastener, or a button fastener. Certain aspects may use fewer or no inner dividers 115, allowing removable coolant sheet 120, removable cushioning pad 130, and/or removable insulating pad 140 to rest in direct contact with each other in mat shell 110.

Cooling mat 100 can be a modular mat. In such aspects, at least one closed edge on each cooling mat 100 features at least one connective fastener. In the aspects shown in FIGS. 1a, 1b, and 3, the fasteners on one short edge include multiple snap sockets 117 while the opposite short edge features multiple corresponding snap posts 118. The closed long edge (i.e. the edge opposite shell closure flap 113 in aspect shown in FIG. 1a) generally has multiple pairs of snap sockets 117 and snap posts 118 spaced regularly along the edge. In still other aspects, snap sockets 117 and snap posts 118 may be replaced by other fasteners, such as, but not limited to, buttons and buttonholes, hook-and-loop fasteners, hook-and-eye fasteners, zippers, and any other fastener known in the art.

In one aspect, a first pair of snap sockets 117 and snap posts 118 is located next to the first short edge, a second pair is located in the middle of the long edge, and a third pair is located next to the second short edge. The open ends of snap sockets 117 can all face in the same direction; this direction is opposite the direction faced by snap posts 118. This can ensure connection of the long edges no matter which cooling mat 100 the user places over the other. In other aspects, at least one open end of the snap sockets 117 faces in the same direction as at least one of the snap posts 118. In still other aspects, more or fewer pairs of snap sockets 117 and snap posts 118 may be used.

Coolant sheet 120 is typically a polymeric backing layer and a polymeric top layer forming "cells" of freezable coolant encapsulated in rows and columns. The heat absorption capacity of the frozen coolant sheet 120 serves to increase the heat absorption capacity of animal cooling mat 100 above typical gel mats used at room temperature. In one aspect, the size of coolant sheet 120 is approximately 7x10 to 8x11 cells. Certain aspects may use multiple coolant sheets 120 collectively having a total of approximately 70 to 88 cells. In one aspect, the coolant in the cells is water, due to water's non-toxicity and phase change profile, which provides a high heat sink capacity and rapid cooling rate without concomitant thermal shock. Other non-toxic coolants with similar phase change profiles may also be used, such as, but not limited to, a gel or an alternative coolant in the cells.

In certain aspects, at least one cushioning pad 130 is located in the upper compartment formed by upper inner divider 115a and shell envelope 111. Cushioning pad 130 may cushion the animal from coolant sheet 120 and conduct heat more evenly from the animal to coolant sheet 120 to avoid hot or cold spots and increase cooling efficiency. Cushioning pad 130 can also provide increased separation between the animal and coolant sheet 120, preventing potential thermal injury. Cushioning pad 130 can be formed by a cushioning pad shell 131 enclosing a quantity of non-toxic, fluid or semi-fluid heat conductor 133. In one aspect, heat conductor 133 is water. In another aspect, heat conductor 133 is a heat-conducting gel. In one aspect, cushioning pad 130 also includes a cushioning baffle 132 such as, but not limited to, a sheet of open cell foam.

In the aspect of FIGS. 1a through 1d, at least one insulating pad 140 may be located in the lower compartment formed by lower inner divider 115b and shell envelope 111. Insulating pad 140 can provide an additional measure of cushioning to the animal and to insulate coolant sheet 120 from the floor, reducing heat transfer from the floor. Insulating pad 140 may be formed by an insulating pad cover 141 enclosing at least one insulating sheet 142. In various aspects, insulating pad cover 141 is a sealed polymer bag. In one aspect, insulating cover 141 is a low-density polyethylene bag. In various aspects, insulating sheet 142 is a sheet of closed cell polymer foam. In one aspect, insulating sheet 142 is a polyethylene insulating sheet. Other aspects may use polychloroprene, nitrile butadiene rubber (NBR), ethylene-vinyl acetate foam, or another insulating foam. In certain other aspects, insulating sheet 142 is permanently sewn to shell envelope 111 or in between lower inner divider 115b and shell envelope 111. Such aspects may or may not include insulating cover 141.

In use, a user can open shell closure flap 113 of mat shell 110, insert coolant sheet 120 between upper and lower inner dividers 115a and 115b, close shell closure flap 113, and place mat 100 on the ground. An animal may then lie on an upper surface of mat 100, transferring heat to mat 100 from their side and/or belly. The animal's side has a greater surface area, while the belly typically has less fur (in some cases, no fur, allowing most efficacious direct skin-to-cooling mat 100 contact), making a more efficient heat transfer. Mat 100 is easily transportable, allowing it to be used in a building, out-of-doors, or in a vehicle.

Figure 3:
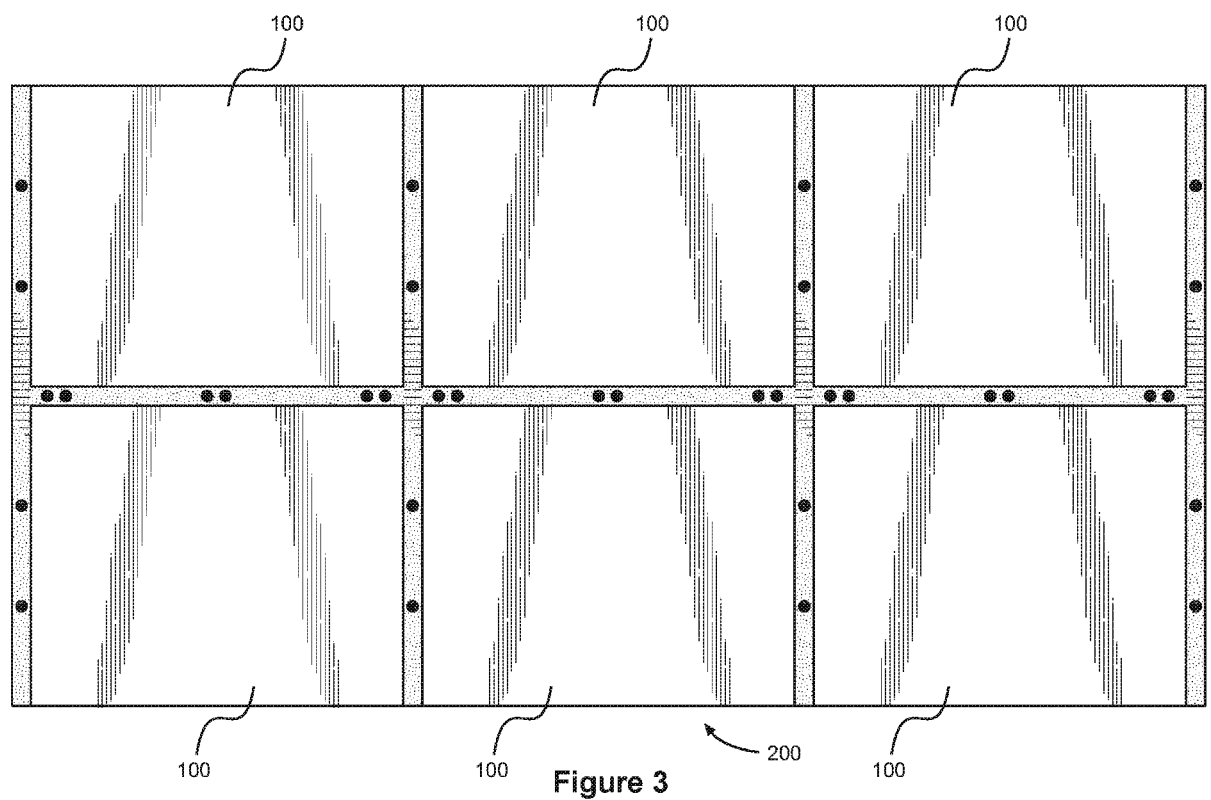
FIG. 3 illustrates an aspect of a modular cooling mat system.

As can be seen in FIG. 3, cooling mat 100 may be a modular mat. Cooling mat 100 can be used on its own for smaller animals, or multiple cooling mats 100 may be attached together to accommodate multiple or larger animals in a cooling mat system 200. One aspect of cooling mat system 200 shown in FIG. 3 has a 2x3 configuration. In other aspects, cooling mat system 200 may have a 1x2, 2x1, 1xn, or 2xn configuration of cooling mats 100, where n is any number of cooling mats 100 a user wishes to include. The number of connected cooling mats 100 could range to the dozens or even hundreds.

It should be understood that while the background refers to dogs, the apparatus and system may accommodate cooling any animal capable of resting on the apparatus.

In the foregoing description, certain terms have been used for brevity, clearness, and understanding. No unnecessary limitations are to be inferred therefrom beyond the requirement of the prior art because such terms are used for descriptive purposes and are intended to be broadly construed. Any different configurations, systems, and method steps described herein may be used alone or in combination with other configurations, systems, and method steps. It is to be expected that various equivalents, alternatives, and modifications are possible within the scope of the appended claims.

What is claimed is:
1. An animal cooling mat apparatus, comprising:
   a mat shell, wherein the mat shell comprises a shell envelope formed from two rectangular layers connected together such that at least one coolant sheet is located between the two rectangular layers;
   the at least one coolant sheet, wherein the at least one coolant sheet is removably located within the mat shell, wherein the at least one coolant sheet comprises a plurality of cells containing coolant;

at least one cushioning pad, wherein the at least one cushioning pad is removably located within the mat shell above the at least one coolant sheet, wherein the at least one cushioning pad cushions a user from coolant sheet and conducts heat more evenly from the user to the at least one coolant sheet to avoid hot or cold spots and increase cooling efficiency, wherein the at least one cushioning pad comprises a cushioning pad shell enclosing a fluid or semi-fluid heat conductor; and at least one insulating pad, wherein the at least one insulating pad is located within the mat shell below the at least one coolant sheet such that the at least one coolant sheet separates the at least one cushioning pad from the at least one insulating pad.

2. The apparatus of claim 1, wherein the mat shell comprises two rectangular layers of synthetic fabric connected together along three sides.

3. The apparatus of claim 2, wherein the mat shell comprises a shell closure flap extending from an unattached edge of one of the rectangular layers.

4. The apparatus of claim 2, wherein the mat shell comprises at least one of an upper inner divider and a lower inner divider, wherein each of the upper and lower inner dividers is a layer of synthetic fabric held in place between the rectangular layers of the shell envelope.

5. The apparatus of claim 1, wherein the mat shell comprises a shell envelope formed from a ripstop polyester coated with a polymer backing on the inner surfaces of the shell envelope.

6. The apparatus of claim 1, wherein the cushioning pad further comprises a cushioning baffle.

7. The apparatus of claim 1, wherein the at least one insulating pad comprises at least one insulating sheet.

8. The apparatus of claim 7, wherein the at least one insulating sheet is a sheet of closed cell polymer foam.

9. The apparatus of claim 7, wherein the at least one insulating pad comprises an insulating pad cover enclosing the at least one insulating sheet.

10. The apparatus of claim 9, wherein the insulating pad cover is a sealed polymer bag.

11. A cooling mat system, comprising:

a plurality of animal cooling mat apparatuses, each apparatus comprising:

a mat shell, wherein the mat shell comprises a shell envelope formed from two rectangular layers connected together such that at least one coolant sheet is located between the two rectangular layers, the at least one coolant sheet, wherein the at least one coolant sheet is removably located within the mat shell, wherein the at least one coolant sheet comprises a plurality of cells containing coolant, at least one cushioning pad, wherein the at least one cushioning pad is removably located within the mat shell above the at least one coolant sheet, wherein the at least one cushioning pad cushions a user from coolant sheet and conducts heat more evenly from the user to the at least one coolant sheet to avoid hot or cold spots and increase cooling efficiency, wherein the at least one cushioning pad comprises a cushioning pad shell enclosing a fluid or semi-fluid heat conductor, and at least one insulating pad, wherein the at least one insulating pad is located within the mat shell below the at least one coolant sheet such that the at least one coolant sheet separates the at least one cushioning pad from the at least one insulating pad, wherein each of the plurality of animal cooling mat apparatuses is connected along at least one edge to another of the plurality of animal cooling mat apparatuses.

12. The system of claim 11, wherein the mat shell comprises a plurality of fasteners along a first short edge and a plurality of fasteners along a second short edge, wherein the first short edge is opposite the second short edge.

13. The system of claim 11, wherein the mat shell comprises a plurality of fasteners spaced regularly along a closed long edge.

14. The system of claim 11, wherein the mat shell comprises a plurality of snap sockets along a first short edge and a plurality of snap posts along a second short edge, wherein the first short edge is opposite the second short edge.

15. The system of claim 14, wherein each open end of the snap sockets of the plurality of pairs of snap sockets and snap posts faces in the same direction.

16. The system of claim 14, wherein each of the snap sockets of the plurality of pairs of snap sockets and snap posts faces a direction opposite each of the snap posts of the plurality of pairs of snap sockets and snap posts.

17. The system of claim 11, wherein the mat shell comprises at least one pair of fasteners along at least one closed edge.

18. The system of claim 17, wherein the at least one pair of fasteners comprises a plurality of regularly spaced pairs of snap sockets and snap posts, wherein at least one open end of the snap sockets faces in the same direction as at least one of the snap posts.

19. The system of claim 17, wherein the at least one pair of fasteners comprises a plurality of regularly spaced pairs of snap sockets and snap posts, wherein at least one open end of the snap sockets faces a direction opposite at least one of the of the snap posts.

* * * * *